(12) United States Patent
Knoedgen

(10) Patent No.: US 6,710,995 B2
(45) Date of Patent: Mar. 23, 2004

(54) BATTERY PROTECTION BY A SEQUENTIAL BLOWING FUSE

(75) Inventor: Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 322 days.

(21) Appl. No.: 09/996,270

(22) Filed: Nov. 28, 2001

(65) Prior Publication Data

US 2003/0095369 A1 May 22, 2003

(30) Foreign Application Priority Data

Nov. 19, 2001 (EP) ............................................ 01480114

(51) Int. Cl.$^7$ ................................................ H02H 5/04
(52) U.S. Cl. ...................................... 361/104; 361/93.1
(58) Field of Search ................................ 361/104, 93.1, 361/88; 320/134, 136

(56) References Cited

U.S. PATENT DOCUMENTS

| | | | |
|---|---|---|---|
| 3,882,529 A | 5/1975 | Warner, Jr. ................... | 357/13 |
| 4,081,853 A | 3/1978 | Wickson ...................... | 361/104 |
| 4,698,736 A | 10/1987 | Higa ............................. | 363/51 |
| 5,631,794 A | 5/1997 | Yang ............................. | 361/60 |
| 5,754,384 A | 5/1998 | Ashley ......................... | 361/93 |
| 6,049,144 A | 4/2000 | Frannhagen et al. ........ | 307/130 |
| 6,051,955 A * | 4/2000 | Saeki et al. .................. | 320/121 |
| 6,172,482 B1 | 1/2001 | Eguchi ......................... | 320/134 |

FOREIGN PATENT DOCUMENTS

CH 412071 A 4/1966
SU 13 27202 A1 7/1987 .......... H01H/85/30

OTHER PUBLICATIONS

R.L. Nailen, "Battery Protection—Where We Stand?", 1990 IEEE, Industrial & Commercial Power Systems Technical Conference, pp. 69–78.

* cited by examiner

Primary Examiner—Brian Sircus
Assistant Examiner—James A Demakis
(74) Attorney, Agent, or Firm—George O. Saile; Stephen B. Ackerman; Douglas R. Schnabel

(57) ABSTRACT

A battery protection circuit for use between a battery output and a load is achieved. The circuit comprises, first, a plurality of fused cells coupled in parallel between the battery output and the load. Each fused cell comprises, first, a fuse having first and second terminals where the first terminal is coupled to a battery output. Second, a means having zener effect has a p terminal and an n terminal. The p terminal is coupled to the second terminal of the fuse. Finally, a cell switch having first and second terminals completes each fused cell. The cell switch first terminal is coupled to the second terminal of the fuse, and the cell switch second terminal is coupled to the n terminal of the diode to form a cell output. Finally, the battery protection circuit comprises a shorting switch, that may comprise a MOS transistor that exhibits punch through, that is coupled between the load and each fused cell output. The current source second terminal is coupled to ground. Finally, a switch is coupled between the plurality of diode-connected MOS transistors output and the current source first terminal. The plurality of fused cells forms a large current rating fuse that can be blown at a small current rating during error conditions using a sequential blowing technique.

29 Claims, 4 Drawing Sheets

BATTERY PROTECTION BY A SEQUENTIAL BLOWING FUSE

BACKGROUND OF THE INVENTION (1) Field of the Invention

The invention relates to battery circuits, and more particularly, to a battery protection circuit using a sequential blowing fuse circuit.

(2) Description of the Prior Art

Rechargeable batteries are used in a variety of portable electronics devices such as mobile phones. The use of rechargeable batteries brings several challenges to the area of circuit protection. It is necessary to protect both the electronic device and the battery from over current and voltage conditions. Further, it is necessary to protect the battery cell from over current for both the forward, or discharging, direction and for the reverse, or charging, direction. Failure to adequately protect the battery during recharging can result in the battery exploding.

Referring now to FIG. 1, a prior art battery protection scheme for a mobile phone battery is illustrated. A battery, VBATT 10, is rated in this example at about 4.2 Volts. The battery output OUT 52 drives the LOAD 56 through a protection network 20. The LOAD is coupled to the mobile phone circuit 30 and to a battery charging source $I_{CHARGE}$ 40. The protection circuit 20 comprises a fuse F1 44 and a switch S1 48. The protection circuit 20 works by simply turning on the switch S1 48 to allow current flow. If the current is larger than the rating on the fuse F1 44, then the fuse will blow, or be destroyed, to open the circuit connection.

A problem with the prior art circuit is that fuse F1 44 must have a high rating so that it does not blow inadvertently. However, if there is a fault on the LOAD 56 node, such as a large over voltage condition, the current can be quite large. If the fuse does not blow at a low enough value, the reverse current into the battery may cause the battery to explode.

Several prior art inventions describe battery protection circuits using fuses. U.S. Pat. No. 4,698,736 to Higa teaches a protection circuit for a power converter apparatus. The circuit comprises plural series-parallel connected elements. Fuses are connected in series with semiconductor elements and in parallel with nonlinear resistors. U.S. Pat. No. 5,754,384 to Ashley describes an over discharge current protection circuit for a battery. U.S. Pat. No. 6,049,144 to Frannhagen et al describes a rechargeable battery with a built-in safety circuit. An active device is connected in parallel with the battery cell while the fuse is connected in series. U.S. Pat. No. 6,172,482 to Eguchi describes a battery protection circuit.

SUMMARY OF THE INVENTION

A principal object of the present invention is to provide an effective and very manufacturable protection circuit for a battery.

A further object of the present invention is to provide battery protection circuit where the fuse apparatus is tripped at a lower value for a reverse current than for a forward current.

In accordance with the objects of this invention, a battery protection circuit for use between a battery output and a load is achieved. The circuit comprises, first, a plurality of fused cells coupled in parallel between the battery output and the load. Each fused cell comprises, first, a fuse having first and second terminals where the first terminal is coupled to a battery output. Second, a means having zener effect has a p terminal and an n terminal. The p terminal is coupled to the second terminal of the fuse. Finally, a cell switch having first and second terminals completes each fused cell. The cell switch first terminal is coupled to the second terminal of the fuse, and the cell switch second terminal is coupled to the n terminal of the diode to form a cell output. Finally, the battery protection circuit comprises a shorting switch, that may comprise a MOS transistor that exhibits punch through, that is coupled between the load and each fused cell output. The plurality of fused cells forms a large current rating fuse that can be blown at a small current rating during error conditions using a sequential blowing technique.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel circuit for protecting a battery from over current conditions both in the reverse and in the positive direction. It should be clear to those experienced in the art that the present invention can be applied and extended without deviating from the scope of the present invention.

Figure 1:
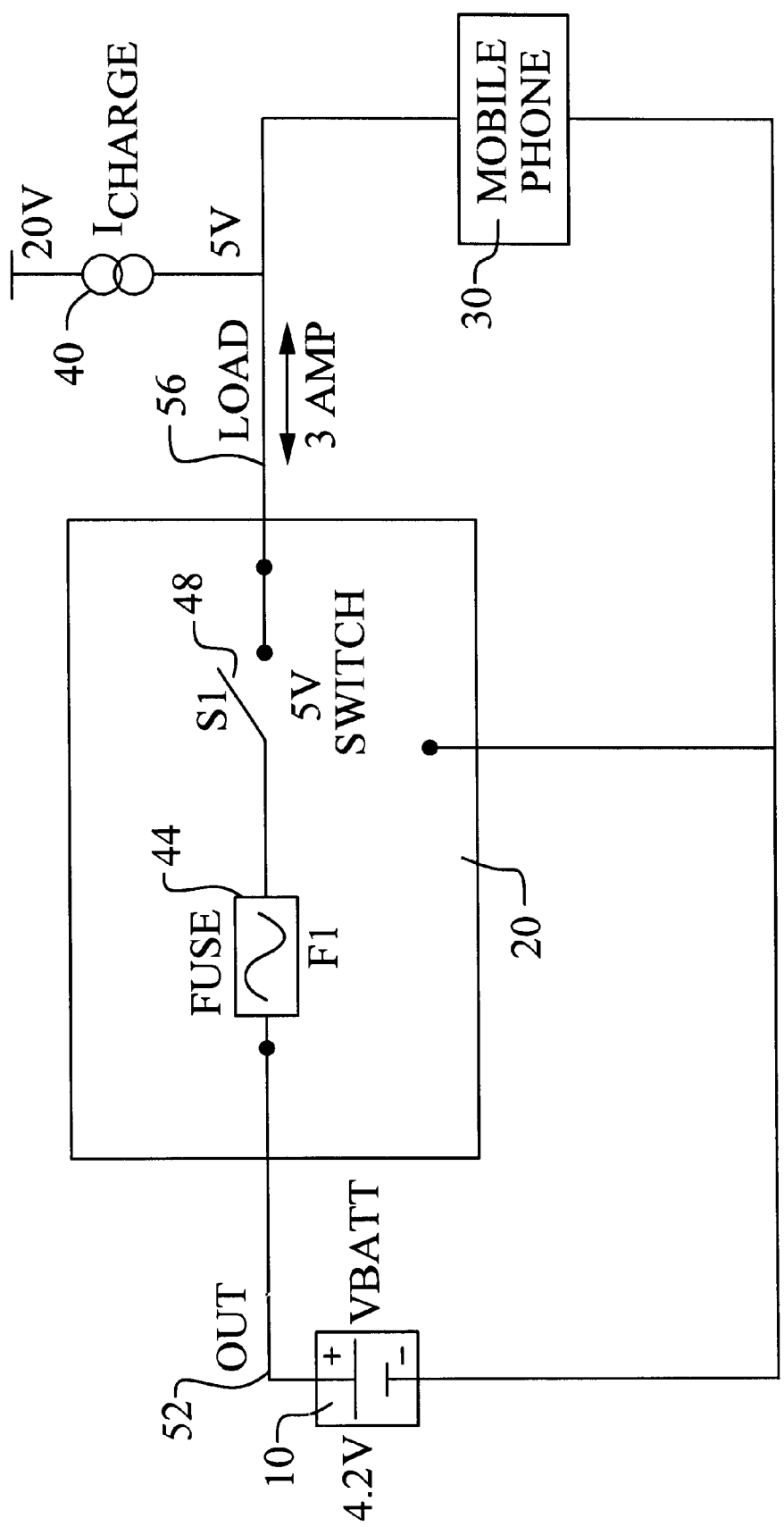
FIG. 1 illustrates a prior art battery protection scheme for a mobile phone battery.
Figure 2:
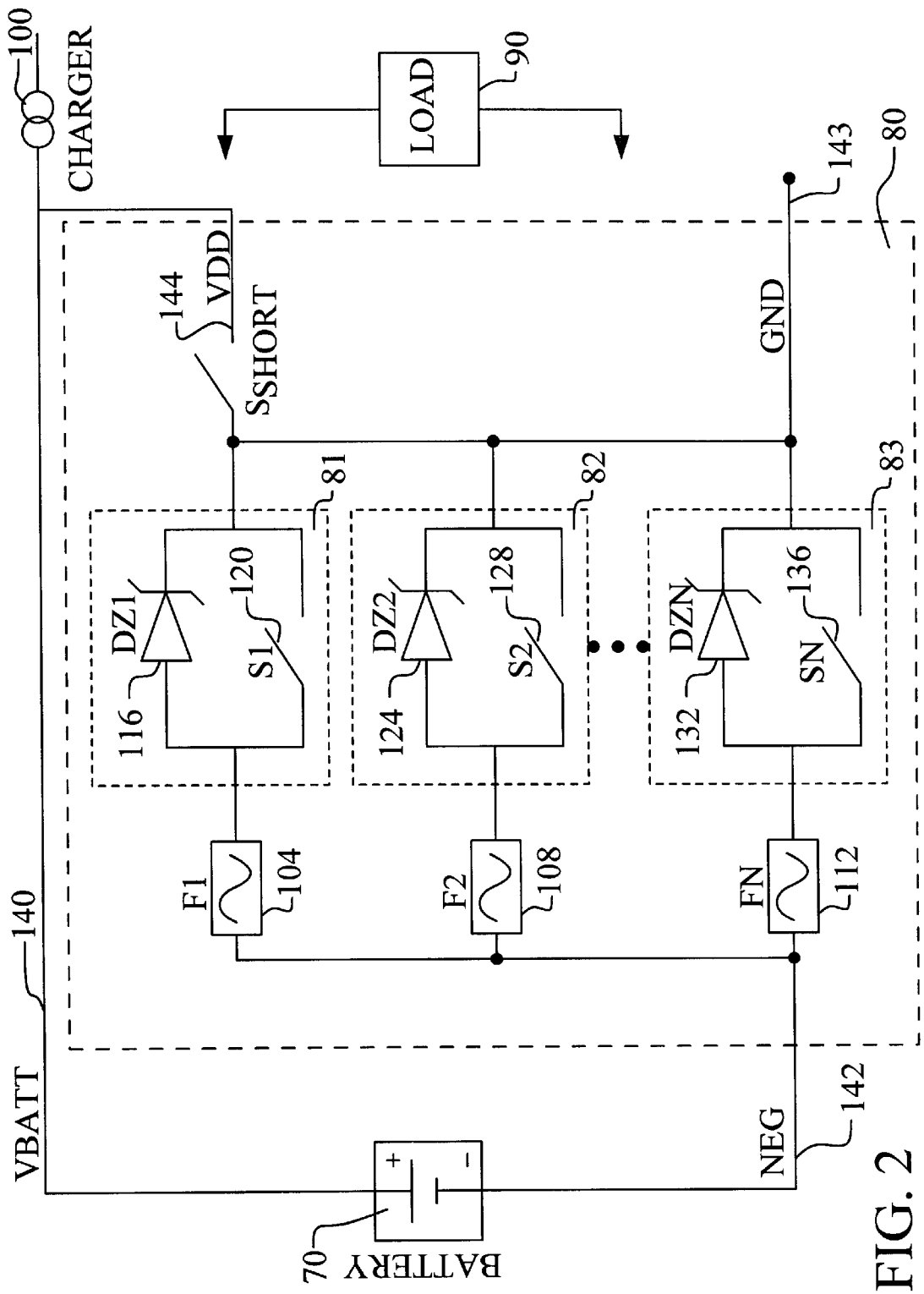
FIG. 2 illustrates the preferred embodiment of the present invention.

Referring now to FIG. 2, the preferred embodiment of the present invention is illustrated. Several important features of the present invention are shown. As in the prior art example, a battery VBATT 70 drives a LOAD 144 through a protection circuit 80. The protection circuit 80 comprises a plurality of fused cells 81, 82, and 83, that are coupled in parallel between the battery negative terminal NEG 142 and the load ground GND 143. Note that the plurality of fused cells can also be coupled between the positive battery terminal VBATT 140 and the load. Each fused cell, such as cell 81, comprises, first, a fuse F1 104 having first and second terminals. The first terminal is coupled to the battery output NEG 142.

Preferably, the fuses F1 104, F2 108, through F3 112 comprise on-chip fuses and, more preferably, silicon on-chip fuses. The novel design of the circuit uses relatively low current rating fuses, such as on-chip fuses, to create a large effective value, combined fuse. This effective fuse exhibits a large effective value for normal operation yet maintains a small blowing current value during error conditions. This is an important feature of the present invention.

Figure 3:
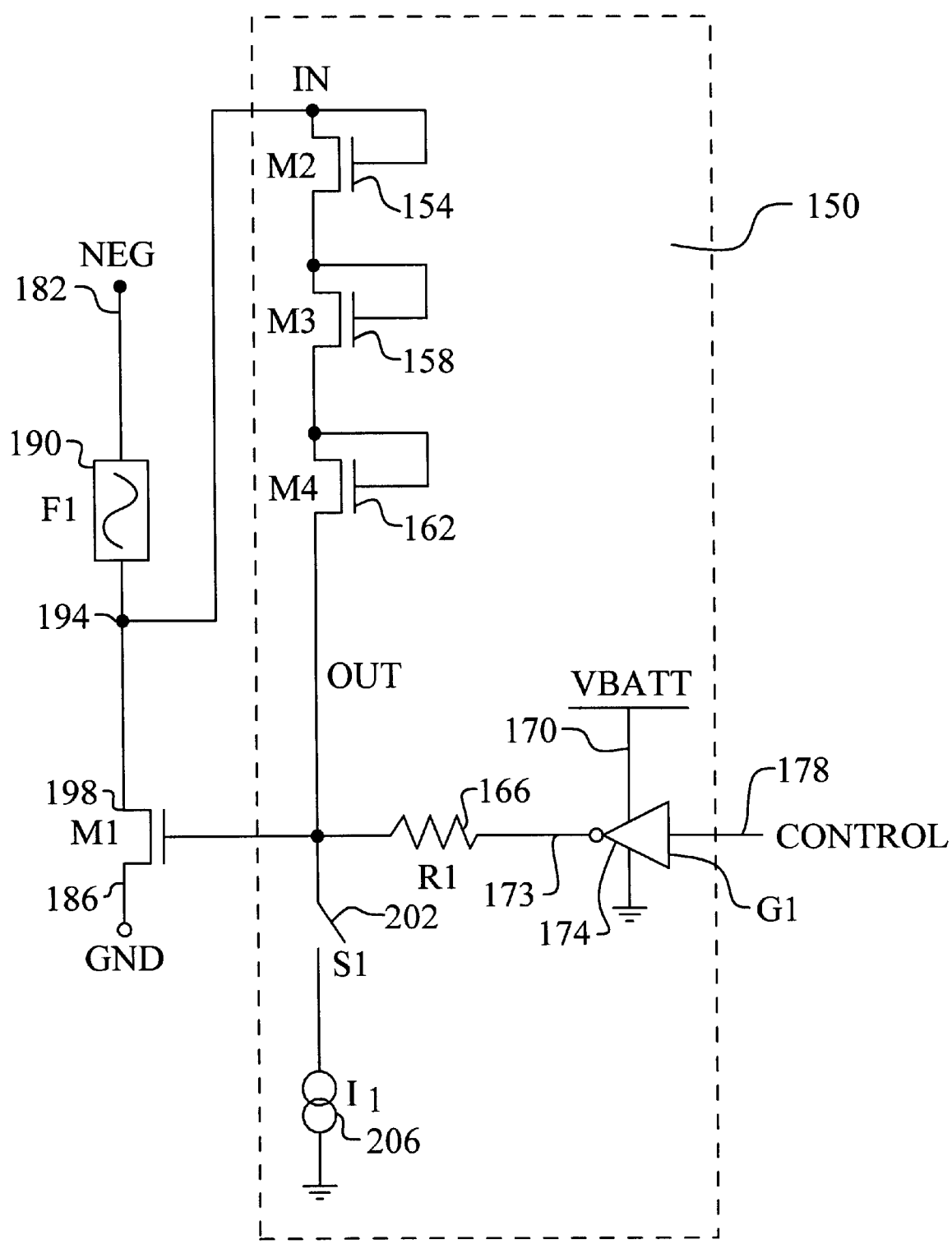
FIG. 3 illustrates a first preferred embodiment of the means of zener effect of the circuit of the present invention.
Figure 4:
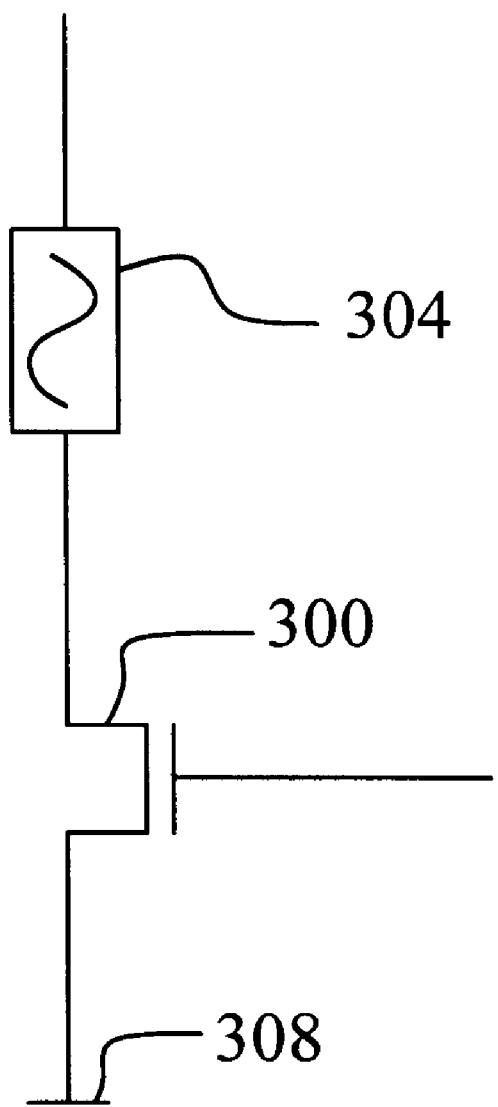
FIG. 4 illustrates a second preferred embodiment of the means of zener effect of the circuit of the present invention.

As an important feature, a means of zener effect DZ1 116 has a p terminal and an n terminal. The means of zener effect may be an actual zener diode formed by a p-n junction, it may be a MOS transistor exhibiting a punch-through effect during certain operating conditions such as is shown in FIG. 4, or it may be a more complex implementation as shown in FIG. 3. Referring again to FIG. 2, the means of zener effect DZ1 for each fused cell must exhibit the key zener operation of conducting current when the reverse bias exceeds a reverse breakdown voltage. The means of zener effect p terminal is coupled to the second terminal of the fuse F1 104. Each fused cell contains a switch S1 120 that has first and second terminals. The switch first terminal is coupled to the second terminal of the fuse F1 104, and the switch second terminal is coupled to the n terminal of the means of zener effect DZ1 116 to form a cell output.

Finally, the protection circuit is completed by a shorting switch 144 that is coupled between the fused cell outputs and the positive batter terminal VBATT 140. The shorting switch 144 preferably comprises a MOS transistor that is standard for the process. This transistor 144 may comprise either a NMOS or a PMOS device. The MOS transistor 144 exhibits punch-through when a high voltage, during an over voltage event, is present across the battery terminals VBATT 140 and GND 143. For example, a MOS transistor having a channel length of about 0.5 microns may exhibit the punch-through breakdown at about 9 Volts. In this case, the device will respond like a zener diode to an over voltage in excess of 9 Volts. In addition, the breakdown voltage may be tailored by selecting the appropriate transistor length. The same transistor may, for example, exhibit about a 7 Volt punch-through, or zener effect, if the gate length is limited to only about 0.4 microns.

The key concept of the circuit is that, first, a relatively large fuse is formed by the parallel combination of the fused cells 81, 82, and 83. Therefore, during normal forward operation, the circuit can use fuses (F1, F2, F3) with a small breakdown rating to achieve a large rating in the forward direction. During normal operation, all of the cell switches S1–SN are ON and the shorting switch $S_{SHORT}$ is OFF. Secondly, the circuit exhibits a smaller fuse value when an error voltage (over charging voltage or under discharging voltage) is detected. During these error conditions, all of the cell switches S1–SN are turned OFF and the shorting switch $S_{SHORT}$ is turned ON. $S_{SHORT}$ conducts in an attempt to protect the fuses. However, if the current passes the maximum level, then $S_{SHORT}$ is shut OFF and the cell switches are turned ON sequentially to cause sequential blowing of the fuses at a relatively low current level. In this way, relatively small fuses, such as about 4 Amp on-chip fuses, may be used to protect the circuit up to about 40 Amps for forward, discharing operation. Yet, during charging, a protection level of about 4 Amps is advantageously achieved. The use of the means of zener effect and the shorting switch create this advantage.

For example, each individual fuse may comprise a fuse current of between about 200 mA and about 5 Amp. A very wide fuse current range may exist. However a fuse with a 100 mA fuse current may be made. If 100 of these fuses are placed in parallel, then the blowing current will be given by the rating of one fuse multiplied by N, or about 50 Amp. Such a fuse is able to withstand a 25 Amp peak current without any problems. However, for a charging over voltage condition, the fuse current rating is given by the rating of just one of the fuses, or about 100 mA. Therefore, the circuit is well-suited to protect the battery from over voltage during charging while not overly limiting discharging current performance. Finally, it is further preferred that the fuses comprise on-chip silicon fuses.

Referring now to FIG. 3, the first preferred embodiment of the means of zener effect is shown. The means of zener effect 150 preferably comprises, first, a plurality of diode-connected MOS transistors M2 154, M3 158, and M4 162, coupled in series and having an input 194 and an output 175. The input IN 194 is coupled to the second fuse F1 terminal 194. The output OUT 175 is coupled to the switch M1 input 175. A tri-stateable digital logic gate G1 has an input CONTROL 178 and an output 173. A resistor R1 166 is coupled between the digital logic gate output 173 and the plurality of diode-connected MOS transistors output OUT 175 to thereby control the switch M1. A switch S1 202 is coupled between the output of the plurality of diode-connected MOS transistors M2 154, M3 158, and M4 162 and a current sink $I_1$ 206 to ground.

Note that transistor M1 198 is the equivalent of the cell switch (for example S1) of FIG. 2. Referring again to FIG. 3, diode-connected MOS devices M2, M3, and M4, create between about 3 Volts and about 4 Volts drop. Further, to turn OFF M1 an additional about 1 Volt is needed. Therefore, the total voltage drop of this circuit is greater than about 5 Volts. By adjusting the number of diode-connect MOS transistors, the voltage drop can be adjusted.

If the gate-to-source voltage of M1 198 is about 5 Volts, then the transistor is turned ON. This can be done using the tri-stateable logic gate 174. When M2–M4 are flowing current, the gate of M1 198 goes high and switches ON M1 by the $V_{th}$ shift of the transistors. The logic gate 174 is then tri-stated and only a small current flows from the gate to ground. Under normal operation voltages and currents, S1 202 is OFF and the tri-state is disabled. During a voltage error (such as an over voltage) S1 is turned ON and the tri-state is activated. Therefore, a voltage drop is created by the current ($I_1$) flowing through M2–M4. When a current error creates a condition where the fuse F1 190 must be blown, then the tri-state is disabled and M1 is switched ON totally.

Referring now to FIG. 4, a second preferred embodiment of the means of zener effect is shown. In this embodiment, a standard MOS transistor 300 is coupled between the fuse 304 and ground 308. The MOS transistor 300 gate length is designed such that the device exhibits punch-through breakdown from drain-to-source when the drain-to-source voltage exceeds a specific value. For example, the punch-through voltage of 0.5 micron device ay be about 9 Volts. Note that, once the device goes into punch-through, the lifetime of the device is no longer an issue. The device begins to blow the fuse and, after a few milliseconds, the device is 100% dead.

The present invention provides an effective and very manufacturable protection circuit for a battery. The battery protection circuit uses a fuse apparatus that is tripped at a lower value for a reverse current than for a forward current. The circuit uses relatively small rating, on-chip fuses to create a parallel combined fuse with a large effective rating. Yet, during an error condition, the fuses are sequentially blown using a small blowing current.

As shown in the preferred embodiments, the novel method and structure provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A battery protection circuit for use between a battery output and a load wherein said circuit comprises:
   a plurality of fused cells coupled in parallel between said battery output and said load and wherein each said fused cell comprises:
     a fuse having first and second terminals wherein said first terminal is coupled to a battery output;
     a means having zener effect having a p terminal and an n terminal wherein said p terminal is coupled to said second terminal of said fuse; and a cell switch having first and second terminals wherein said first terminal is coupled to said second terminal of said fuse and wherein said second terminal is coupled to said n-terminal of said means having zener effect to form a cell output; and a shorting switch coupled between said load and each said cell output.

2. The circuit according to claim 1 wherein said means having zener effect comprises a MOS transistor that exhibits punch through during an over voltage condition.

3. The circuit according to claim 1 wherein said means having zener effect comprises a zener diode.

4. The circuit according to claim 1 wherein said fuse comprises a silicon on-chip fuse.

5. The circuit according to claim 1 wherein all said cell switches are ON and said shorting switch is OFF during normal operation, wherein all said cell switches are OFF and said shorting switch is ON when an error voltage is detected, and wherein said shorting switch is OFF and each said cell switch is seqentially turned ON to cause sequential fuse blowing when said error voltage and an over current are detected.

6. The circuit according to claim 1 wherein said plurality of fused cells are coupled to the negative terminal of said battery.

7. The circuit according to claim 1 wherein said plurality of fused cells are coupled to the positive terminal of said battery.

8. The circuit according to claim 1 wherein each said means having zener effect comprises:

a plurality of diode-connected MOS transistors coupled in series and having an input and an output wherein said input is coupled to said second fuse terminal;

a tri-stateable digital logic gate having an input and an output;

a resistor coupled between said digital logic gate output and said plurality of diode-connected MOS transistors output to thereby control said switch;

a current source having a first terminal and a second terminal wherein said second terminal coupled to ground; and a switch coupled between said plurality of diode-connected MOS transistors output and said current source first terminal.

9. The circuit according to claim 8 wherein said switch is OFF in normal operation and wherein said switch is ON and said tri-stateable digital logic gate is in tri-state during an over voltage detection.

10. The circuit according to claim 8 wherein said diode-connected MOS transistors comprise NMOS transistors.

11. The circuit according to claim 8 wherein said diode-connected MOS transistors comprise PMOS transistors.

12. The circuit according to claim 1 wherein said shorting switch comprises a MOS transistor that exhibits punch through during an over voltage condition.

13. A battery protection circuit for use between a battery output and a load wherein said circuit comprises a plurality of fused cells coupled in parallel between said battery output and said load and wherein each said fused cell comprises:

a fuse having first and second terminals wherein said first terminal is coupled to a battery output;

a means having zener effect having a p terminal and an n terminal wherein said p terminal is coupled to said second terminal of said fuse and said n terminal is coupled to said load and wherein said means having zener effect comprises:

a plurality of diode-connected MOS transistors coupled in series and having an input and an output wherein said input is coupled to said second fuse terminal;

a tri-stateable digital logic gate having an input and an output;

a resistor coupled between said digital logic gate output and said plurality of diode-connected MOS transistors output to thereby control an MOS transistor switch;

a current source having a first terminal and a second terminal wherein said second terminal coupled to ground; and a switch coupled between said plurality of diode-connected MOS transistors output and said current source first terminal;

a cell switch having first and second terminals wherein said first terminal is coupled to said second terminal of said fuse and wherein said second terminal is coupled to said n-terminal of said diode to form a cell output; and a shorting switch coupled between said load and each said cell output.

14. The circuit according to claim 13 wherein said fuse comprises a silicon on-chip fuse.

15. The circuit according to claim 13 wherein all said cell switches are ON and said shorting switch is OFF under normal conditions, wherein all said cell switches are OFF and said shorting switch is ON when an error voltage is detected, and wherein said shorting switch is OFF and each said cell switch is seqentially turned ON to cause sequential fuse blowing when said error voltage and an over current are detected.

16. The circuit according to claim 13 wherein said plurality of fused cells are coupled to the negative terminal of said battery.

17. The circuit according to claim 13 wherein said plurality of fused cells are coupled to the positive terminal of said battery.

18. The circuit according to claim 13 wherein said switch is OFF in normal operation and wherein said switch is ON and said tri-stateable digital logic gate is in tri-state during an over voltage detection.

19. The circuit according to claim 13 wherein said diode-connected MOS transistors comprise NMOS transistors.

20. The circuit according to claim 13 wherein said diode-connected MOS transistors comprise PMOS transistors.

21. The circuit according to claim 13 wherein said shorting switch comprises a MOS transistor that exhibits punch through during an over voltage condition.

22. A battery protection circuit for use between a battery output and a load wherein said circuit comprises a plurality of fused cells coupled in parallel between said battery output and said load and wherein each said fused cell comprises:

a fuse having first and second terminals wherein said first terminal is coupled to a battery output;

a means having zener effect having a p terminal and an n terminal wherein said p terminal is coupled to said second terminal of said fuse and said n terminal is coupled to said load and wherein said means having zener effect comprises:

a plurality of diode-connected MOS transistors coupled in series and having an input and an output wherein said input is coupled to said second fuse terminal;

a tri-stateable digital logic gate having an input and an output;

a resistor coupled between said digital logic gate output and said plurality of diode-connected MOS transistors output to thereby control an MOS transistor switch;

a current source having a first terminal and a second terminal wherein said second terminal coupled to ground; and a switch coupled between said plurality of diode connected MOS transistors output and said current source first terminal;

a cell switch having first and second terminals wherein said first terminal is coupled to said second terminal of said fuse and wherein said second terminal is coupled to said n-terminal of said diode to form a cell output; and a shorting switch coupled between said load and each said cell output wherein all said cell switches are ON and said shorting switch is OFF during normal operation, wherein all said cell switches are OFF and said shorting switch is ON when an error voltage is detected, and wherein said shorting switch is OFF and each said cell switch is sequentially turned ON to cause sequential fuse blowing when said error voltage and an over current are detected.

23. The circuit according to claim 22 wherein said fuse comprises a silicon on-chip fuse.

24. The circuit according to claim 22 wherein said plurality of fused cells are coupled to the negative terminal of said battery.

25. The circuit according to claim 22 wherein said plurality of fused cells are coupled to the positive terminal of said battery.

26. The circuit according to claim 22 wherein said switch is OFF in normal operation and wherein said switch is ON and said tri-stateable digital logic gate is in tri-state during an over voltage detection.

27. The circuit according to claim 22 wherein said diode-connected MOS transistors comprise NMOS transistors.

28. The circuit according to claim 22 wherein said diode-connected MOS transistors comprise PMOS transistors.

29. The circuit according to claim 22 wherein said shorting switch comprises a MOS transistor that exhibits punch through during an over voltage condition.

* * * * *